(12) United States Patent
Colline et al.

(10) Patent No.: US 11,321,023 B2
(45) Date of Patent: *May 3, 2022

(54) METHOD AND APPARATUS FOR RAPID VOLUME REFORMATTING

(71) Applicant: Seagate Technology LLC, Cupertino, CA (US)

(72) Inventors: Phillip Raymond Colline, Tustin, CA (US); Thomas George Wicklund, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 16/786,802

(22) Filed: Feb. 10, 2020

(65) Prior Publication Data
US 2020/0174710 A1    Jun. 4, 2020

Related U.S. Application Data

(63) Continuation of application No. 15/153,874, filed on May 13, 2016, now Pat. No. 10,564,903.

(51) Int. Cl.
*G06F 3/06* (2006.01)

(52) U.S. Cl.
CPC .......... *G06F 3/0689* (2013.01); *G06F 3/0608* (2013.01); *G06F 3/0661* (2013.01); *G06F 3/0664* (2013.01)

(58) Field of Classification Search
CPC .... G06F 3/0607; G06F 3/0629; G06F 3/0632; G06F 3/0638; G06F 3/0644; G06F 3/0619; G06F 3/0689; G06F 3/0608; G06F 3/0661; G06F 3/0664; G06F 2003/0695
See application file for complete search history.

(56) References Cited

U.S. PATENT DOCUMENTS

| | | | |
|---|---|---|---|
| 5,943,689 A | 8/1999 | Tamer | |
| 6,467,023 B1 | 10/2002 | DeKoning | |
| 6,813,687 B1 | 11/2004 | Humlicek | |
| 8,756,345 B2 | 6/2014 | Singh et al. | |
| 9,134,926 B2 | 9/2015 | Kelton | |
| 9,235,471 B2 | 1/2016 | Sun et al. | |
| 10,424,311 B2 * | 9/2019 | Kamkar | H03G 3/342 |
| 2003/0233596 A1 | 12/2003 | Corbin | |
| 2004/0215877 A1 | 10/2004 | Chatterjee | |
| 2004/0221102 A1 | 11/2004 | Watanabe | |
| 2005/0086249 A1 * | 4/2005 | Keohane | G06F 3/0607 |
| 2008/0159059 A1 * | 7/2008 | Moyer | G06F 3/061 |
| | | | 365/236 |
| 2012/0047342 A1 | 2/2012 | Grusy et al. | |

(Continued)

*Primary Examiner* — Ernest Unelus
(74) *Attorney, Agent, or Firm* — Holzer Patel Drennan (57) ABSTRACT

A storage controller is provided. The storage controller includes circuitry configured to utilize a format command to change a storage volume coupled to the storage controller from a first format to a second format and memory configured to store a data structure for first and second format indications for the storage volume. The storage controller determines if a selected band is initialized to the second format, and if the selected band is not initialized to the second format, the storage controller initializes the selected band to the second format and updates the data structure to indicate the selected band is initialized to the second format.

20 Claims, 10 Drawing Sheets

Storage Volume Low Level Format using High Water Mark

(56) References Cited

U.S. PATENT DOCUMENTS

| | | |
|---|---|---|
| 2012/0173882 A1 | 7/2012 | Horn |
| 2013/0124812 A1 | 5/2013 | Grusy et al. |
| 2014/0059305 A1 | 2/2014 | Kondo |
| 2014/0122745 A1 | 5/2014 | Singh et al. |
| 2014/0181431 A1 | 6/2014 | Grusy et al. |
| 2014/0325144 A1 | 10/2014 | Kelton |
| 2014/0325157 A1 | 10/2014 | Sangapu |
| 2014/0325265 A1 | 10/2014 | Sun et al. |
| 2015/0006818 A1* | 1/2015 | Kobashi ............... G06F 3/0689 711/114 |
| 2015/0378610 A1 | 12/2015 | Grusy et al. |
| 2016/0378363 A1* | 12/2016 | Jibbe .................... G06F 3/0617 711/114 |

* cited by examiner

Fig. 1 Data Storage System

Fig. 2 Data Storage System

Fig. 3 Storage Volume or Vdisk Band Partitioning

Fig. 4 Storage Volume Low Level Format using High Water Mark

Fig. 5 Metadata

Fig. 6 Low Level Format Process

Fig. 7 Low Level Format Process

Fig. 8 Low Level Format Process

Fig. 9 Storage Volume or Vdisk Write Process

Fig. 10A  Storage Volume or Vdisk Read Process

Fig. 10B  Storage Volume or Vdisk Read Process

METHOD AND APPARATUS FOR RAPID VOLUME REFORMATTING

CROSS-REFERENCE TO RELATED APPLICATIONS

The present application is a continuation of U.S. patent application Ser. No. 15/153,874, entitled "Method and Apparatus for Rapid Volume Reformatting," and filed on May 13, 2016, which is specifically incorporated by reference herein for all that it discloses or teaches.

BACKGROUND

The need to store digital files, documents, pictures, images and other data continues to increase rapidly. In connection with the electronic storage of data, systems incorporating one or more data storage controllers have been devised. Storage controllers receive data read and write requests from host computers and control one or more physical storage devices to beneficially store or provide the requested data from/to the host computers.

Storage controllers generally buffer read and write data requests, often converting the host data read and write requests into RAID or storage device read or write commands. Many storage controllers store read and write data in cache memories included as part of the storage controllers. In general, storage controllers are designed and intended to service both sequential and random read and write requests from one or more host computers.

SUMMARY

The present invention is directed to solving disadvantages of the prior art. In accordance with an embodiment of the present invention, a storage controller is provided.

The storage controller includes circuitry configured to utilize a format command to change a storage volume coupled to the storage controller from a first format to a second format and memory configured to store a data structure for first and second format indications for the storage volume. The storage controller determines if a selected band is initialized to the second format, and if the selected band is not initialized to the second format, the storage controller initializes the selected band to the second format and updates the data structure to indicate the selected band is initialized to the second format.

In accordance with embodiments of the present invention, a method is provided. The method includes issuing, by a hardware storage controller, a format command changing a storage volume from a first format to a second format, selecting a band of the storage volume to initialize, and determining, by the hardware storage controller, if the selected band is initialized to the second format. If the selected band is not initialized to the second format, the method includes initializing the selected band to the second format. The method also includes updating a data structure to indicate the selected band is initialized to the second format.

In accordance with yet other embodiments of the present invention, a system is provided. The system includes a storage volume including a plurality of bands and a storage controller, coupled to the storage volume and operable to issue a format command to the storage volume to change the format from a first format to a second format, select a band of the plurality of bands to initialize, and determine if the selected band is initialized to the second format. If the selected band is not initialized to the second format, the storage controller is operable to initialize the selected band to the second format and update a data structure to indicate the selected band is initialized to the second format.

Additional features and advantages of embodiments of the present invention will become more readily apparent from the following description, particularly when taken together with the accompanying drawings.

DETAILED DESCRIPTION

The present invention is directed to improvements to low level format processes and associated usage for storage systems. Storage volumes and virtual disks (Vdisks) must be low-level formatted prior to storing data. The low-level format is applied across all physical storage devices in the storage volume or Vdisk. Low-level formats include at least a predetermined sector size, such as 512 or 4,096 bytes per sector, and also metadata describing the data stored within each sector. One of the most important aspects of the metadata is related to protecting data integrity within each sector.

Data Integrity Field (DIF) was an approach to protect data integrity in computer data storage. It was proposed in 2003 by the T10 subcommittee of the International Committee for Information Technology Standards. Packet-based storage transport protocols have Cyclic Redundancy Check (CRC) protection on command and data payloads, and interconnect buses generally have parity protection. Memory systems have parity detection/correction schemes to correct single-bit errors. I/O protocol controllers at the transport/interconnect boundaries have internal data path protection.

Data availability in storage systems is frequently measured simply in terms of the reliability of the hardware components and the effects of redundant hardware. But the reliability of the software, its ability to detect errors, and its ability to correctly report or apply corrective actions to a failure have a significant bearing on the overall storage system availability. The data exchange usually takes place between a storage controller, usually a Redundant Array of Independent Disks (RAID) controller, and storage devices directly controlled by the storage controller.

DIF included extending the disk sector from its traditional 512 bytes to 520 bytes by adding eight additional protection bytes. This extended sector is defined for Small Computer System Interface (SCSI) protocol storage devices, which is in turn used in many enterprise storage technologies. An evolution of this technology called Protection Information (PI) was introduced in 2012, and is currently the standard used for end-to-end data protection between host computers and storage devices, and therefore between storage controllers and storage devices. In addition to PI, some vendors utilize proprietary information within each sector—sometimes instead of conventional PI and in other cases in addition to PI.

In order to accommodate newer versions of PI and potentially customized sector information, storage volumes must be reformatted. Traditionally, this requires first backing up the entire storage volume to an offline media, sometimes tape. Once backed up, all sectors are sequentially low-level formatted from the old sector format to the new sector format, while generally initializing the sectors with a known data pattern. After reformatting the entire storage volume, the backed-up data is then restored to the newly formatted storage volume. The traditional process takes the storage volume offline for often many hours. In the offline state, host computer data read write requests are suspended to the storage volume—usually resulting in lost productivity. For this reason, low-level reformatting is generally performed during evening hours and on weekends when most application activity to the storage volume is at a minimum. As storage volumes and physical storage devices become increasingly large, the low-level format time increases constantly. For very large storage volumes, even if the low-level format is started at the end of a day, this may still intrude on productivity during normal business hours the next day.

What is needed are ways to rapidly low-level format storage volumes or Vdisks in order to update larger sectors and new or additional types of sector metadata. These improved processes need to accommodate continued host read and write requests in order to not stall host applications and to maintain system productivity during lengthy low-level formats.

Figure 1:
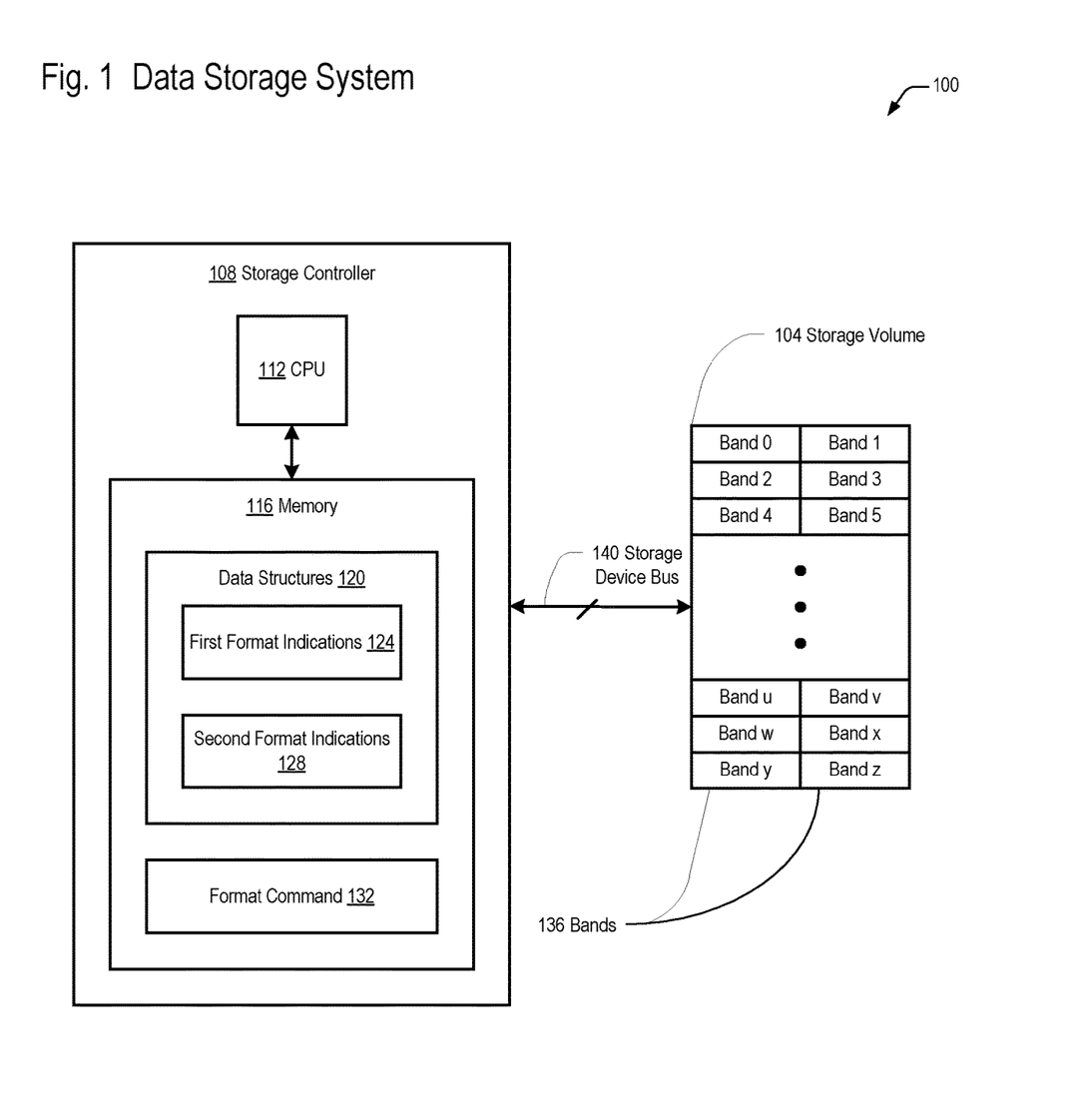
FIG. 1 is a block diagram illustrating components of a data storage system in accordance with a first embodiment of the present invention.

Referring now to FIG. 1, a block diagram illustrating components of a data storage system 100 in accordance with a first embodiment of the present invention is shown.

The data storage system 100 includes at least one storage controller 108. In some embodiments, storage controllers 108 are hardware storage controllers 108 with associated circuitry to perform functions of the invention. In one embodiment, storage controller 108 is a RAID controller. In another embodiment, storage controller 108 is a storage appliance such as a provisioning, virtualization, replication, or backup appliance. Storage controller 108 transfers data to and from one or more storage volumes or Vdisks 104 over one or more storage device buses 140. Storage device buses 140 are any suitable storage bus or group of buses for transferring data directly between storage controller 108 and storage devices making up storage volumes 104, including but not limited to Small Computer Systems Interface (SCSI), Fiber Channel, Serial-Attached SCSI (SAS), Serial ATA (SATA), Serial Storage Architecture (SSA), and SATA Express.

Storage volumes 104 include various types of physical storage devices, including solid state disks (SSDs), hard disk drives, optical drives, and tape drives. Within a specific storage device type, there may be several sub-categories of storage devices, organized according to performance. For example, hard disk drives may be organized according to cache size, drive RPM (5,400, 7,200, 10,000, and 15,000, for example), queue depth, random transfer rate, or sequential transfer rate.

Each storage volume 104 is divided up into a number of equal-sizes bands 136. Each band 136 includes an integer number of sectors, so that a given sector is in only one band 136. Although there may be any number of bands 136 in a storage volume, FIG. 1 shown z bands 136. The size of bands 136 are selected in order to rapidly low-level format a given band 136 while using a small amount of metadata space for all of the bands 136 in a storage volume 104.

Storage controller 108 includes a CPU or processor 112, which executes program instructions stored in a memory 116 coupled to the CPU 112. CPU 112 includes any processing device suitable for executing storage controller 108 programs, such as Intel x86-compatible processors, embedded processors, mobile processors, and/or RISC processors. CPU 112 may include several devices including field-programmable gate arrays (FPGAs), memory controllers, North Bridge devices, and/or South Bridge devices.

Memory 116 may be one or more forms of volatile memory 116, non-volatile memory 116, or a combination of both volatile and non-volatile memories 116. In some embodiments, the memory 116 includes firmware which includes program instructions that CPU 112 fetches and executes, including program instructions for the processes of the present invention. Examples of non-volatile memory 116 include, but are not limited to, flash memory, SD, Erasable Programmable Read Only Memory (EPROM), Electrically Erasable Programmable Read Only Memory (EEPROM), hard disks, and Non-Volatile Read-Only Memory (NOVRAM). Volatile memory 116 stores various data structures and user data. Examples of volatile memory 116 include, but are not limited to, Static Random Access Memory (SRAM), Dual Data Rate Random Access Memory (DDR RAM), Dual Data Rate 2 Random Access Memory (DDR2 RAM), Dual Data Rate 3 Random Access Memory (DDR3 RAM), Zero Capacitor Random Access Memory (Z-RAM), Twin-Transistor Random Access Memory (TTRAM), Asynchronous Random Access Memory (A-RAM), ETA Random Access Memory (ETA RAM), and other forms of temporary memory.

Memory 116 includes data structures 120, which store metadata used in association with the processes of the present invention. The metadata includes first format indications 124 and second format indications 128. First format indications 124 identify which bands 136 in each storage volume 104 are currently formatted in a first or previous format. The first format indications 124 also identify which storage volumes 104 are formatted to the first format. Second format indications 128 identify which bands 136 in each storage volume 104 are currently formatted in a second or new format, where the second format is a newer format than the first format. The second format indications 128 also identify which storage volumes 104 are formatted to the second format.

Memory 116 also includes a format command 132, issuance of which leads to initiating a low-level format operation for a specific storage volume 132. In one embodiment, the format command 132 is received by the storage controller 108 from a host or management computer and stored in the memory 116. In another embodiment, the format command 132 is resident in the storage controller memory 116, and invoked by a user or application program controlling storage controller 108.

Figure 2:
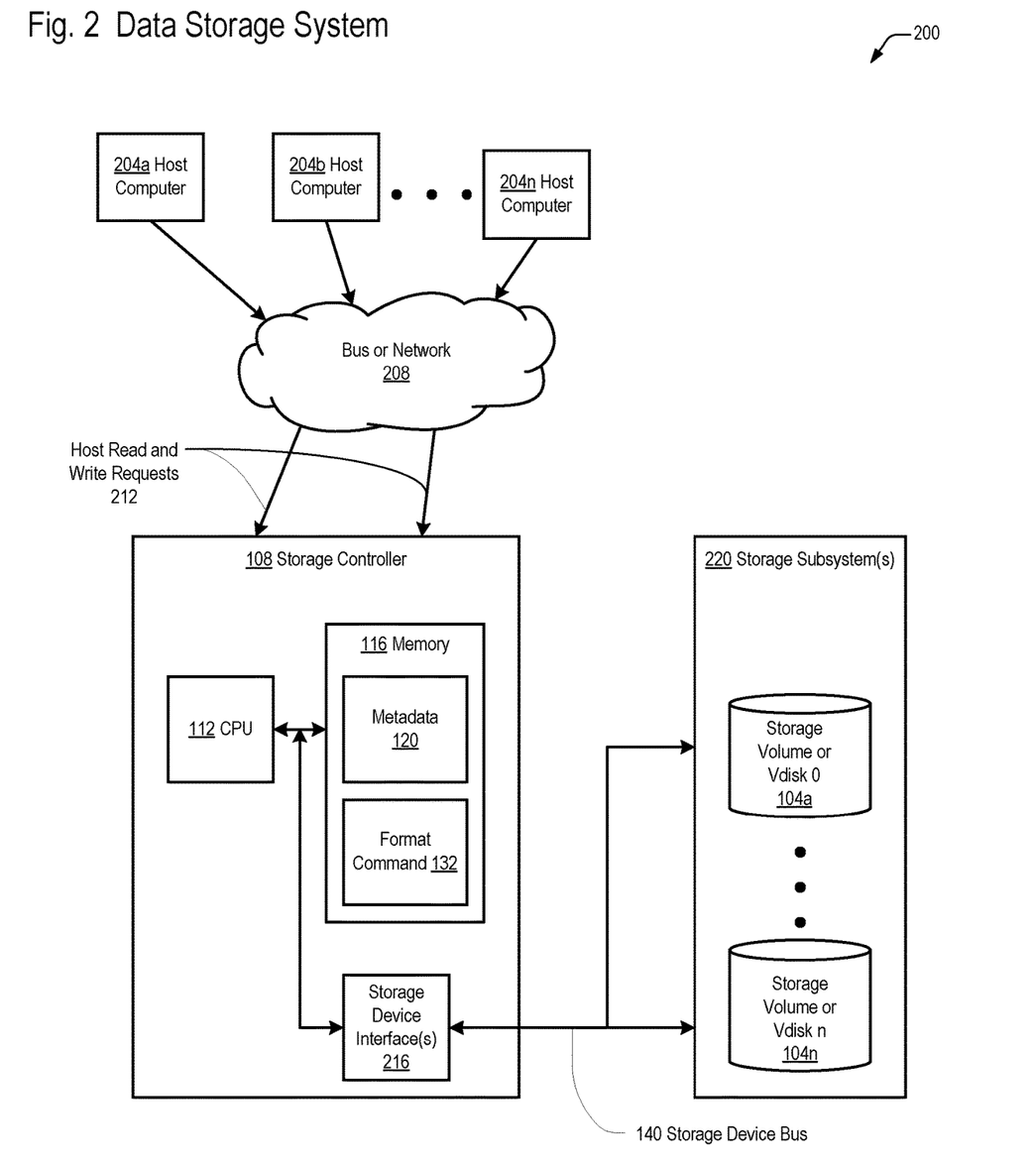
FIG. 2 is a block diagram illustrating components of a data storage system in accordance with a second embodiment of the present invention.

Referring now to FIG. 2, a block diagram illustrating components of a data storage system 200 in accordance with a second embodiment of the present invention is shown. FIG. 2 is used to show some additional or alternate components in a data storage system 200, in order to facilitate familiarity.

The data storage system 200 includes one or more host computers 204, shown as host computer 204a through host computer 204n. Host computers 204 are generally servers, but could also be desktop or mobile computers. Host computers 204 execute application programs that generate read and write requests 212 to storage controller 108 over bus or network 208. Although only one storage controller 108 is shown for simplicity, it should be generally that any number of storage controllers 108 may be present.

Host computers 204 communicate through bus or network 208 with storage controllers 108. Bus or network 208 includes buses such as Small Computer System Interface (SCSI), Fiber Channel Arbitrated Loop (FC-AL), Universal System Bus (USB), FIREWIRE, Serial System Architecture (SSA), Serial Attached SCSI (SAS), Serial ATA (SATA), Peripheral Component Interconnect (PCI), Peripheral Component Interconnect Express (PCI Express), INFINIBAND, or any other bus usable by data storage. In another embodiment, a network such as Ethernet, Internet SCSI (iSCSI), Fiber Channel, SSA, Enterprise Systems Connection (ESCON), Asynchronous Transfer (ATM), Fibre Connection (FICON), or INFINIBAND may possibly be used.

Host computer 204 interfaces with one or more storage controllers 108, although only a single storage controller 108 is illustrated for clarity. In one embodiment, storage controller 108 is a RAID controller, and may be organized as either a single RAID controller 108 or as a pair of redundant RAID controllers 108. In another embodiment, storage controller 108 is a storage appliance such as a provisioning, virtualization, replication, or backup appliance. Storage controller 108 transfers data to and from storage volumes or Vdisks 104 in storage subsystems 220, over storage device buses 140. Storage device buses 140 is any suitable storage bus or group of buses for transferring data directly between storage controllers 108 and storage volumes 104, including but not limited to Small Computer Systems Interface (SCSI), Fiber Channel, Serial-Attached SCSI (SAS), Serial ATA (SATA), or Serial Storage Architecture (SSA). Although there may be only a single storage volume or Vdisk 104 controlled by storage controllers 108, in actuality any number of storage volumes 104 may be controlled. FIG. 2 shows n storage volumes or Vdisks, identified as 104a through 104n.

Storage controller 108 includes memory 116, which includes metadata 120. Metadata are stored parameters that provide current status for storage volumes 104 and banks 136, and are used in the processes of the present invention. Memory 116 also includes a low-level format command 132, which changes the format (if formatted) previously applied to a storage volume 104 to a new format. The previous format may have been unformatted, a conventional sector format with no DIF/PI information present, one of the defined DIF/PI formats, a custom sector format, or a DIF/PI format with additional information present. Also considered a "format" in the context of the present invention is with Full Disk Encryption (FDE), where disks are repurposed. This erases the disks and leaves all disk PI metadata invalid so all blocks must be rewritten. The new format is a different format than the previous format, and includes all of the format options that the previous format could be in.

Storage controller 108 also includes one or more storage device interfaces 216, which may act as endpoint devices for DIF/PI information that travels over the storage device bus(es) 140. Storage devices in the storage volumes or Vdisks 104 act as endpoint devices for the other end of storage device bus(es) 140.

Figure 3:
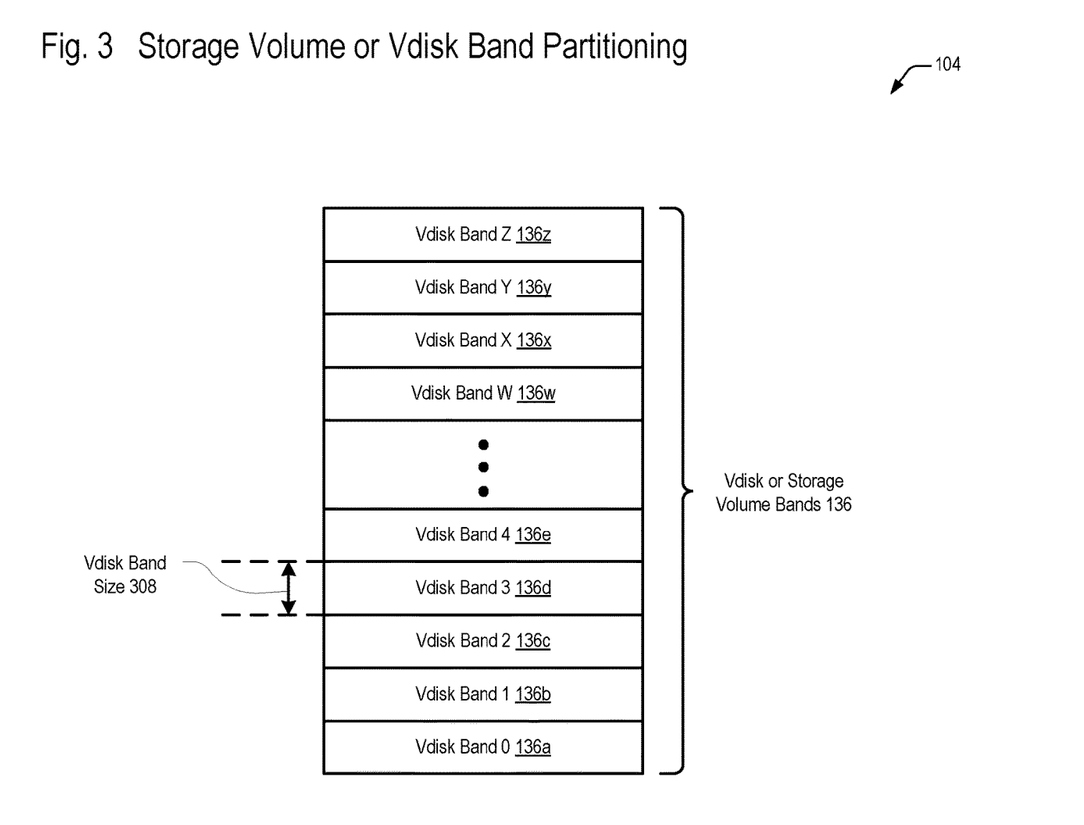
FIG. 3 is a diagram illustrating a storage volume or Vdisk band partitioning in accordance with embodiments of the present invention.

Referring now to FIG. 3, a diagram illustrating a storage volume or Vdisk 104 band partitioning in accordance with embodiments of the present invention is shown. Although FIG. 3 shows Vdisk bands 136 0-Z, it should be understood that a storage volume or vDisk 104 may include any number of Vdisk bands 136.

Each storage device or Vdisk 104 includes an integer number of storage bands 136. In a preferred embodiment, all of the storage bands 136 are equal-sized. In another embodiment, the storage bands 136 within a given storage device may be equal numbers of cylinders, which will then be a variable number of blocks. Each storage band 136 in a given storage volume 104 has a Vdisk band size 308. In most embodiments, the vDisk band size 308 is in some number of Megabytes (MB), with 16-24 MB providing a good balance between band format time and metadata/data structure 120 size in memory 116, given current technology. However, the Vdisk band size 308 may practically be any size, and the present invention allows for substitution of different size 308 parameters for different storage controllers 108, storage device buses 140, or storage devices within a storage volume or Vdisk 104.

Figure 4:
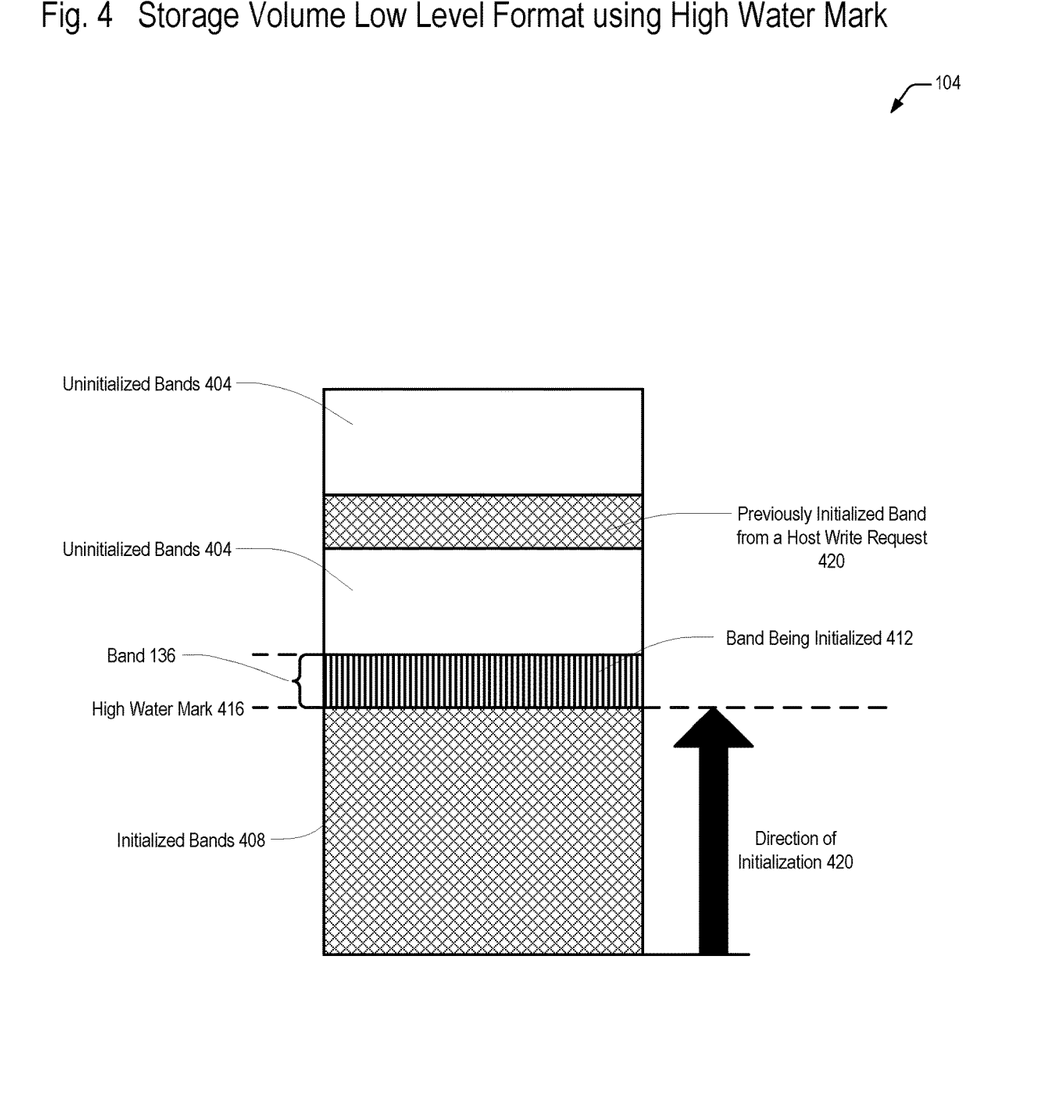
FIG. 4 is a diagram illustrating a storage volume low level format using a High Water Mark in accordance with embodiments of the present invention.

Referring now to FIG. 4, a diagram illustrating a storage volume low level format using a High Water Mark in accordance with embodiments of the present invention is shown. FIG. 4 represents an example of such a storage volume 104, and actual storage volumes 104 using a high water mark 416 may be organized and appear differently at any time during the low-level format process.

A high water mark 416 is an address variable that tracks the demarcation between a previous format and a new format. As such, the high water mark 416 either increases or decreases in address over time. That is, a storage volume 104 low-level format may either proceed from a lowest Logical Block Address (LBA) to a highest LBA, or from a highest LBA to a lowest LBA. Therefore, using the high water mark 416 requires a direction of initialization 420.

Prior to the start of low-level format, all bands 136 are considered uninitialized bands 404. As bands 136 are formatted, they become initialized bands 408. In the example of FIG. 4, if the lowest LBAs are toward the bottom of the Figure, then the direction of initialization 420 is proceeding from the lowest LBA to the highest LBA.

Since the high water mark 416 identifies the point at which all lower LBAs (in this case) are initialized bands 408, the band that is currently being initialized 412 is the band 136 having the next highest LBA above the high water mark 416. This embodiment also allows for initialization of higher bands 136, including a previously initialized band from a previous host write request 420. However, that requires some additional record keeping in the metadata/data structures 120 to identify which band(s) 420 were previously initialized, so the process may skip over them when the high water mark 416 reaches the band 420 in question. Without such record keeping, the process would need to disallow host write requests 212 to uninitialized bands 404 or the band being initialized 412, and only allow writes to initialized bands 408.

Figure 5:
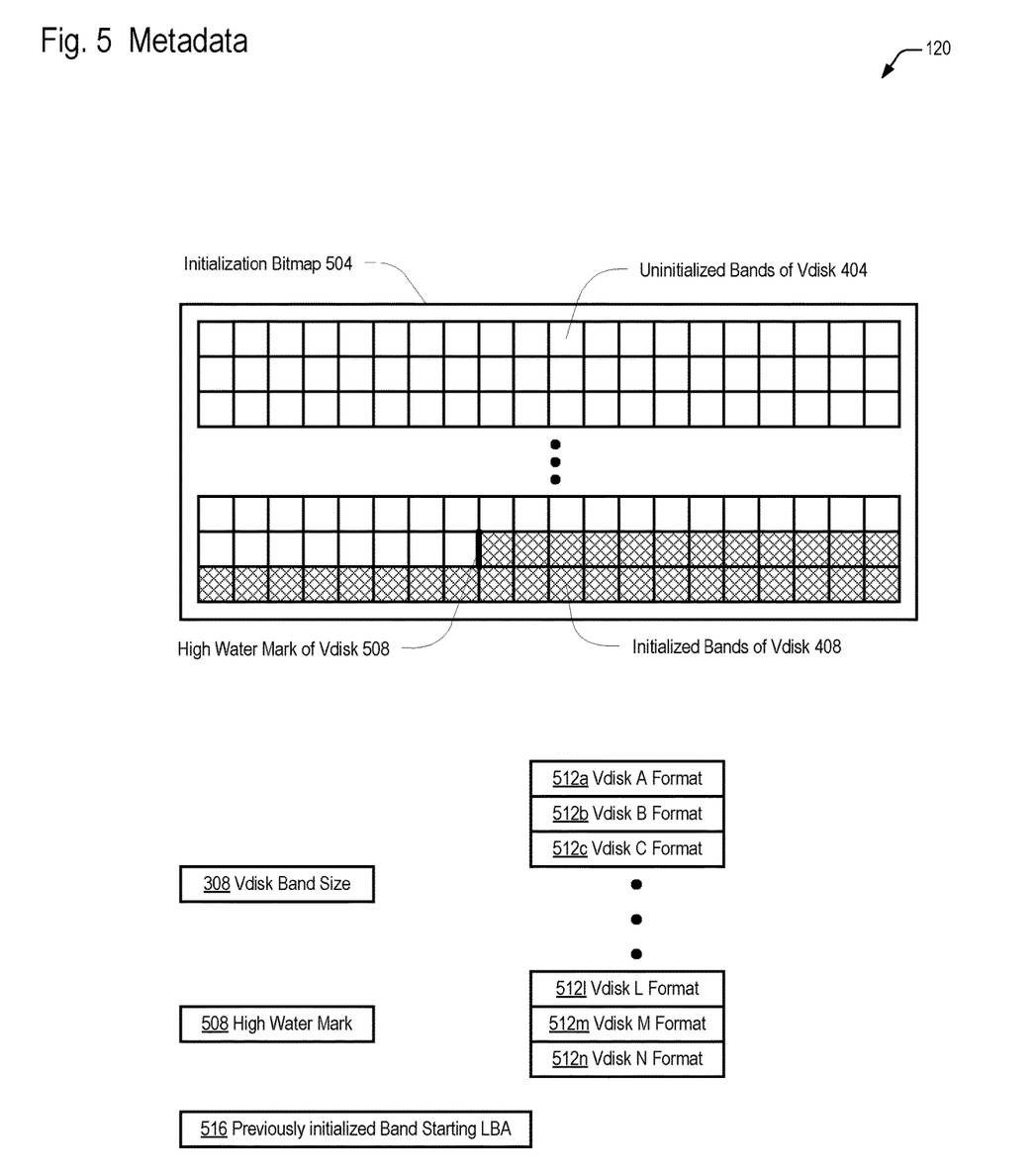
FIG. 5 is a diagram illustrating Metadata in accordance with embodiments of the present invention.

Referring now to FIG. 5, a diagram illustrating Metadata 120 in accordance with embodiments of the present invention is shown. Metadata 120 stores various parameters and data structures that keep track of low-level format details and allow the processes of the present invention to operate as intended. Metadata 120 is stored in some form of Non-volatile memory, including storage devices, in order to maintain integrity across power cycles.

For an embodiment that utilizes an initialization bitmap 504 to keep track of band 136 initialization, a bit is supplied for each band 136 in each storage volume 104. A separate bitmap 504 is therefore required for each storage volume or Vdisk 104 controlled by a storage controller 108. The bitmap 504 is an array of bits. When bands are uninitialized 404, the state of bits in those bands reflects a first value. When bands are initialized 408, the state of bits in those bands reflects a second value opposite to the first value. The CPU 112 may review the bits in the bitmap 504 to understand which bands have been initialized 408 and which have not been initialized 404. The bits will imply the location of the high water mark 508, as that will be the demarcation between the initialized bands 408 and the uninitialized bands 404.

The metadata 120 also includes a Vdisk band size 308. In most embodiments, the Vdisk band size 308 will be the same for all storage volumes or Vdisks 104 controlled by the storage controller 108, but in other environments there may be multiple Vdisk band sizes 308 for different storage volumes or Vdisks 104. This may be valuable, for example, if the physical storage devices in different storage volumes or Vdisks 104 have different performance characteristics leading to different band format times. Therefore, by utilizing different Vdisk band sizes 308, it may be possible to equalize band format times across different storage volumes 104.

The metadata 120 also includes a previously initialized band starting LBA 516. This identifies bands 420 that are initialized out of sequence. Out of sequence initialization may be desirable if a host write request 212 to an uninitialized band 404 is received. Rather than holding off the host write request 212 until the addressed band is initialized 408, this allows the host write request 212 to be completed to the band 420 while also initializing the band. It may be desirable to allocate multiple previously initialized band starting LBAs 516, in order to support multiple host write requests 212 to a given storage volume or Vdisk 104, or to multiple storage volumes or Vdisks 104.

Finally, metadata 120 includes indications of format for each storage volume or Vdisk 512 controlled by the storage controller 108. These indications 512 change state when a low-level format operation has concluded and a storage volume or Vdisk 104 is fully formatted to a new format. This data structure 120 allows easy determination of which storage volumes 104 are in a given format.

Figure 6:
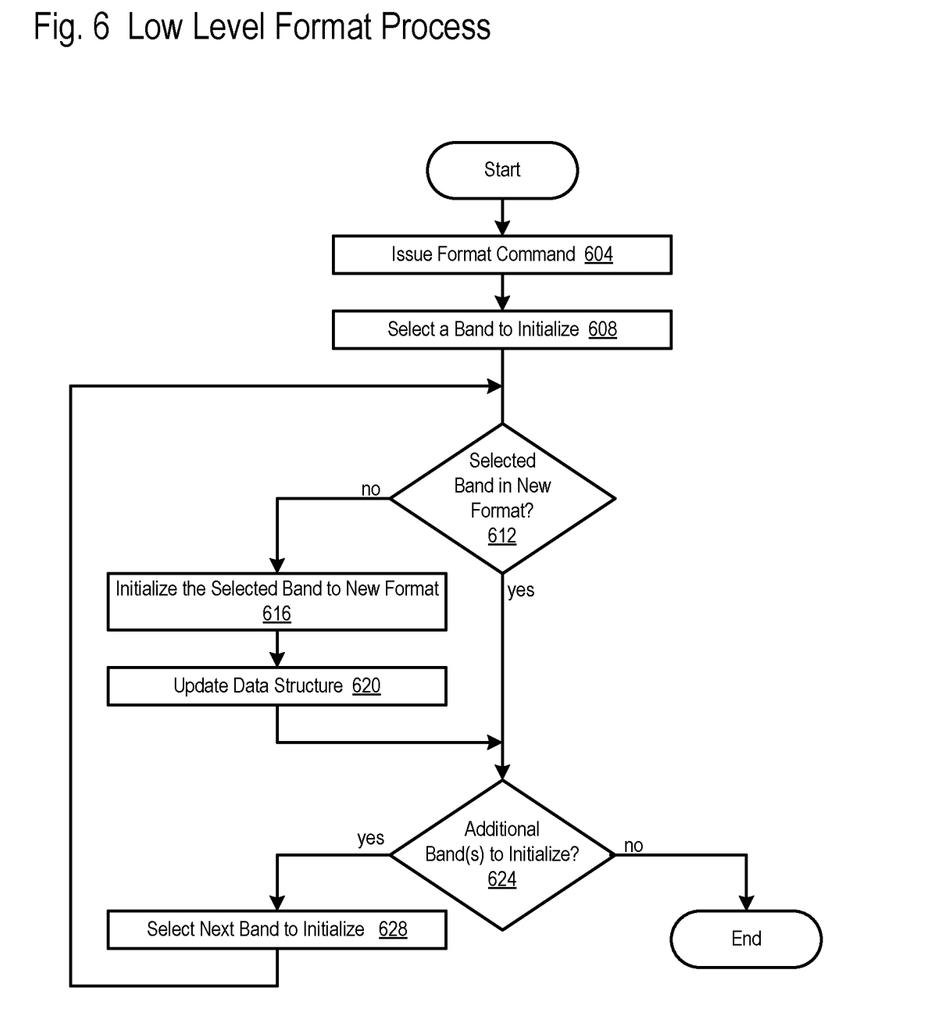
FIG. 6 is a flowchart illustrating a low level format process in accordance with a first embodiment of the present invention.

Referring now to FIG. 6, a flowchart illustrating a low level format process in accordance with a first embodiment of the present invention is shown. Flow begins at block 604.

At block 604, the storage controller 108 issues a format command 132 to a storage volume or Vdisk 104. The format command 132 specifies a new format different from the format the storage volume or Vdisk 104 is currently formatted to. Flow proceeds to block 608.

At block 608, the storage controller 108 selects a band 136 to initialize to a second or new format. In most cases, the selected band 136 will either be the band 136 having either the lowest or the highest starting LBA within the storage volume or Vdisk 104. However, the present invention assumes that bands 136 may be selected in any order, even randomly. Flow proceeds to decision block 612.

At decision block 612, the storage controller 108 determines if the selected band from blocks 608 and 628 is already formatted to the new format specified by the format command 132. If the selected band from blocks 608 and 628 is already formatted to the new format specified by the format command 132, then flow proceeds to decision block 624. If the selected band from blocks 608 and 628 is not already formatted to the new format specified by the format command 132, then flow instead proceeds to block 616.

At block 616, the storage controller 108 initializes the selected band 136 to the new format specified by the format command 132. In addition to writing a predetermined data pattern to the selected band 136, initialization also includes writing to any additional bytes in each sector of the band 136 required checksum, identification, or other information required by the DIF/PI/custom format applying to the new format. Flow proceeds to block 620.

At block 620, the storage controller 108 updates the data structure 120 to reflect the selected band 136 in the new format. Specifically, the storage controller 108 updates the initialization bitmap 504 or High Water Mark 508 corresponding to the storage volume or Vdisk 104. Flow proceeds to decision block 624.

At decision block 624, the storage controller 108 determines if there are additional bands 136 in the storage volume 104 to initialize. If there are additional bands 136 in the storage volume 104 to initialize, then flow proceeds to block 628. If there are not additional bands 136 in the storage volume 104 to initialize, then flow ends at decision block 624.

At block 628, the storage controller 108 selects a next band 136 to initialize. In most embodiments, the next band to initialize will be the adjacent band 136 in the direction of initialization 420 for the storage volume 104. In other embodiments, the next band to initialize will be the next band 136 in the direction of initialization 420 that has a state in the initialization bitmap 504 reflecting the previous or first format. In yet other embodiments, the next band 136 to initialize will be a random band 136 that has a state in the initialization bitmap 504 reflecting the previous or first format. In yet other embodiments, the next band 136 to initialize will alternate between high and low Logical Block Addresses (Butterfly), or initialize bands 136 according to a user-specified priority order. Flow proceeds to decision block 612.

Figure 7:
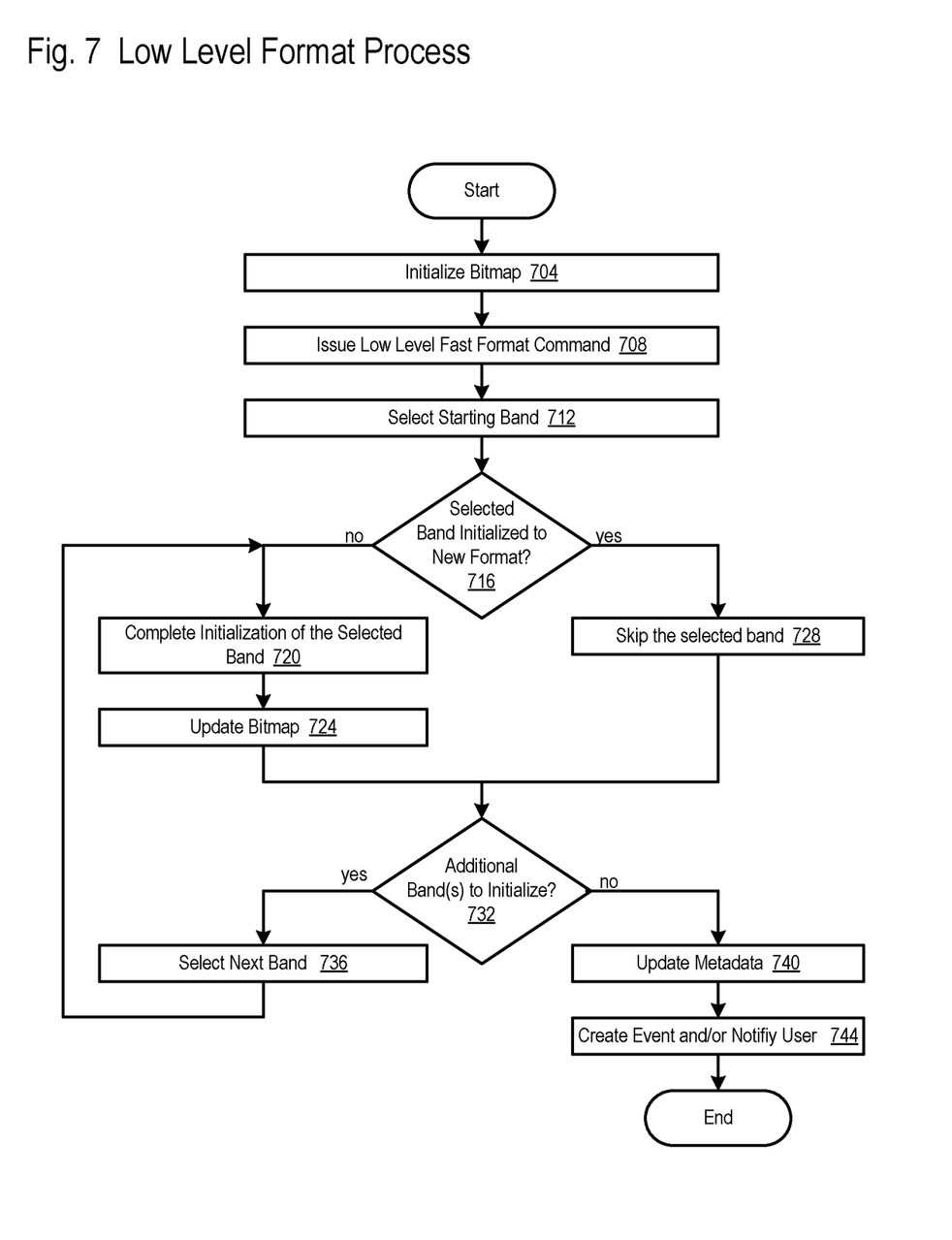
FIG. 7 is a flowchart illustrating a low level format process in accordance with a second embodiment of the present invention.

Referring now to FIG. 7, a flowchart illustrating a low level format process in accordance with a second embodiment of the present invention is shown. Flow begins at block 704.

At block 704, the storage controller 108 initializes a bitmap 504. Initialization of the bitmap 504 includes putting all bits in the bitmap 504 into a common state (0 or 1). The common state indicates that all bands 136 in a storage volume are either uninitialized (unformatted) or initialized to a previous or first format. Flow proceeds to block 708.

At block 708, the storage controller 108 issues a format command 132 to a storage volume or Vdisk 104. The format command 132 specifies a new format different from the format the storage volume or Vdisk 104 is currently formatted to. Flow proceeds to block 712.

At block 712, the storage controller 108 selects a starting band 136 to initialize to a second format. In most cases, the selected band 136 will either be the band 136 having either the lowest or the highest starting LBA within the storage volume or Vdisk 104. However, the present invention assumes that bands 136 may be selected in any order, even randomly. Flow proceeds to decision block 716.

At decision block 716, the storage controller 108 determines if the selected band from block 712 is already formatted to the new format specified by the format command 132. If the selected band is already formatted to the new format specified by the format command 132, then flow proceeds to block 728. If the selected band is not already formatted to the new format specified by the format command 132, then flow instead proceeds to block 720.

At block 720, the storage controller 108 completes initialization of the selected band 136 to the new format specified by the format command 132. In addition to writing a predetermined data pattern to the selected band 136, initialization also includes writing to any additional bytes in each sector of the band 136 required checksum, identification, or other information required by the DIF/PI/custom format applying to the new format. Flow proceeds to block 724.

At block 724, the storage controller 108 updates the bitmap 504 to reflect the selected band 136 in the new format. Flow proceeds to decision block 732.

At block 728, the storage controller 108 skips the selected band 136, since it has already been initialized to the new format. Flow proceeds to decision block 732.

At decision block 732, the storage controller 108 determines if there are additional bands 136 in the storage volume 104 to initialize. If there are additional bands 136 in the storage volume 104 to initialize, then flow proceeds to block 736. If there are not additional bands 136 in the storage volume 104 to initialize, then flow proceeds to block 740.

At block 736, the storage controller 108 selects a next band 136 to initialize. In most embodiments, the next band to initialize will be the adjacent band 136 in the direction of initialization 420 for the storage volume 104. In other embodiments, the next band to initialize will be the next band 136 in the direction of initialization 420 that has a state in the initialization bitmap 504 reflecting the previous or first format. In yet other embodiments, the next band to initialize will be a random band 136 that has a state in the initialization bitmap 504 reflecting the previous or first format. Flow proceeds to block 720.

At block 740, the storage controller 108 updates the metadata 512 to indicate the storage volume 104 is formatted to the new format. Flow proceeds to block 744.

At block 744, the storage controller 108 creates an event or notifies a user that storage volume 104 initialization is complete. Flow ends at block 744.

Figure 8:
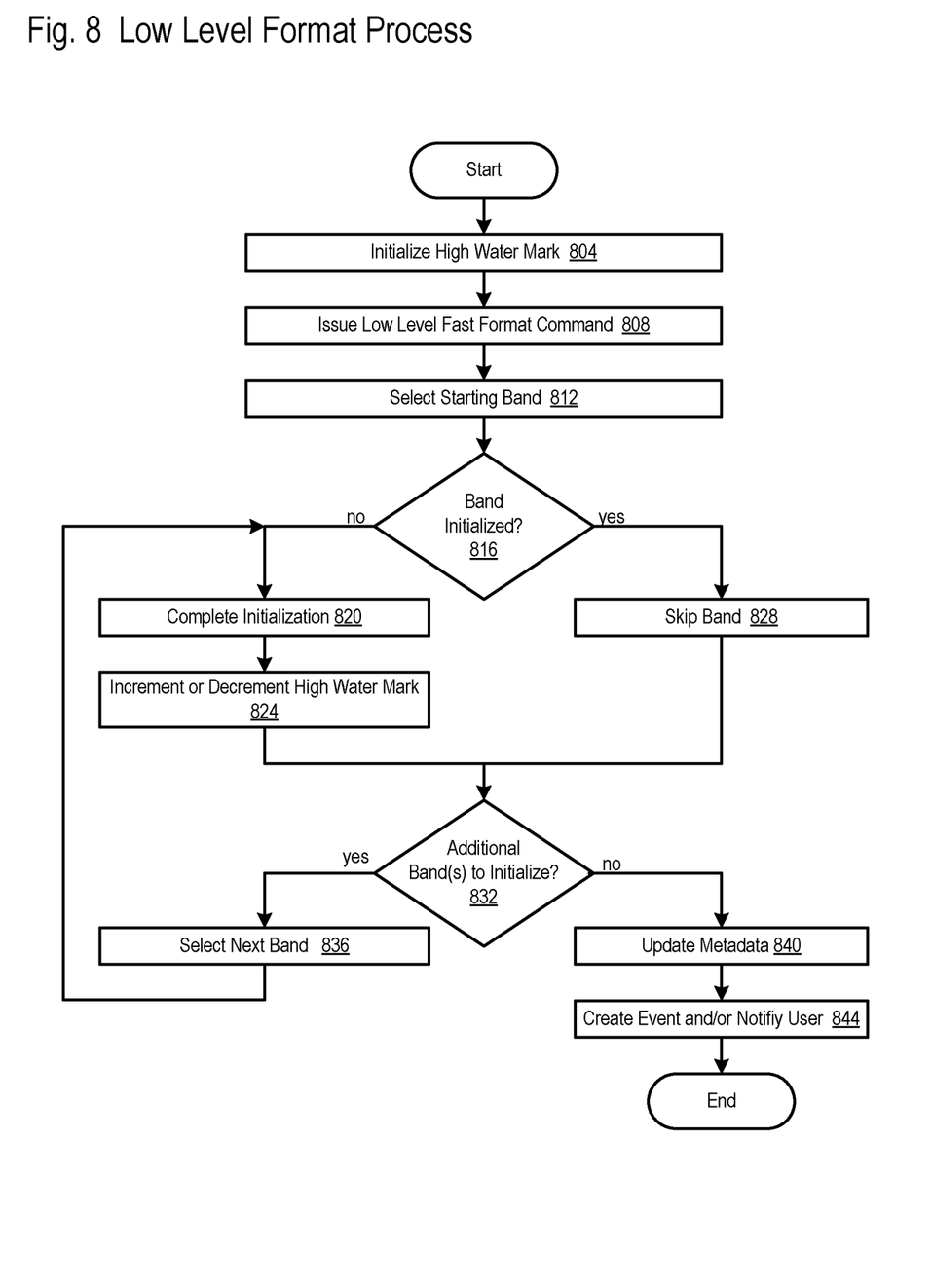
FIG. 8 is a flowchart illustrating a low level format process in accordance with a third embodiment of the present invention.

Referring now to FIG. 8, a flowchart illustrating a low level format process in accordance with a third embodiment of the present invention is shown. Flow begins at block 804.

At block 804, the storage controller 108 initializes a high water mark 508. Initialization of the bitmap 504 includes putting all bits in the bitmap 504 into a common state (0 or 1). The common state indicates that all bands 136 in a storage volume are either uninitialized or initialized to a previous or first format. Flow proceeds to block 808.

At block 808, the storage controller 108 issues a format command 132 to a storage volume or Vdisk 104. The format command 132 specifies a new format different from the format the storage volume or Vdisk 104 is currently formatted to, or currently unformatted. Flow proceeds to block 812.

At block 812, the storage controller 108 selects a starting band 136 to initialize to a second format. The selected band 136 will either be the band 136 having either the lowest or the highest starting LBA within the storage volume or Vdisk 104. In a practical sense, random band 136 selection is not allowable since this embodiment uses a high water mark 508 to keep track of which bands 136 have already been initialized or formatted to the new or second format. Flow proceeds to decision block 816.

At decision block 816, the storage controller 108 determines if the selected band from block 712 is already formatted to the new format specified by the format command 132. If the selected band is already formatted to the new format specified by the format command 132, then flow proceeds to block 828. If the selected band is not already formatted to the new format specified by the format command 132, then flow instead proceeds to block 820.

At block 820, the storage controller 108 completes initialization of the selected band 136 to the new format specified by the format command 132. In addition to writing a predetermined data pattern to the selected band 136, initialization also includes writing to any additional bytes in each sector of the band 136 required checksum, identification, or other information required by the DIF/PI/custom format applying to the new format. Flow proceeds to block 824.

At block 824, the storage controller 108 increments or decrements the high water mark 508 of the storage volume 104 to the next band 136 in sequence. Since the High Water Mark 508 is the starting LBA address, incrementing the High Water Mark 508 means increasing the High Water Mark 508 to reflect the starting LBA address of the next higher band 136 in the storage volume 104. Similarly, decrementing the High Water Mark 508 means decreasing the High Water Mark 508 to reflect the starting LBA address of the next lower band 136 in the storage volume 104. Flow proceeds to decision block 832.

At block 828, the storage controller 108 skips the selected band 136, since it has already been initialized to the new format. Skipping the selected band 136 implies increasing the High Water Mark 508 to reflect the starting LBA address of the next higher band 136 in the storage volume 104 (if the direction of initialization 420 is from lower LBA to higher LBA), or decreasing the High Water Mark 508 to reflect the starting LBA address of the next lower band 136 in the storage volume 104 (if the direction of initialization 420 is from higher LBA to lower LBA). Flow proceeds to decision block 832.

At decision block 832, the storage controller 108 determines if there are additional bands 136 in the storage volume 104 to initialize. If there are additional bands 136 in the storage volume 104 to initialize, then flow proceeds to block 836. If there are not additional bands 136 in the storage volume 104 to initialize, then flow proceeds to block 840.

At block 836, the storage controller 108 selects a next band 136 to initialize. In most embodiments, the next band to initialize will be the adjacent band 136 in the direction of initialization 420 for the storage volume 104. In other embodiments, the next band to initialize will be the next band 136 in the direction of initialization 420 that has a state in the initialization bitmap 504 reflecting the previous or first format. Flow proceeds to block 820.

At block 840, the storage controller 108 updates the metadata 512 to indicate the storage volume 104 is formatted to the new format. Flow proceeds to block 844.

At block 844, the storage controller 108 creates an event or notifies a user that storage volume 104 initialization is complete. Flow ends at block 844.

Figure 9:
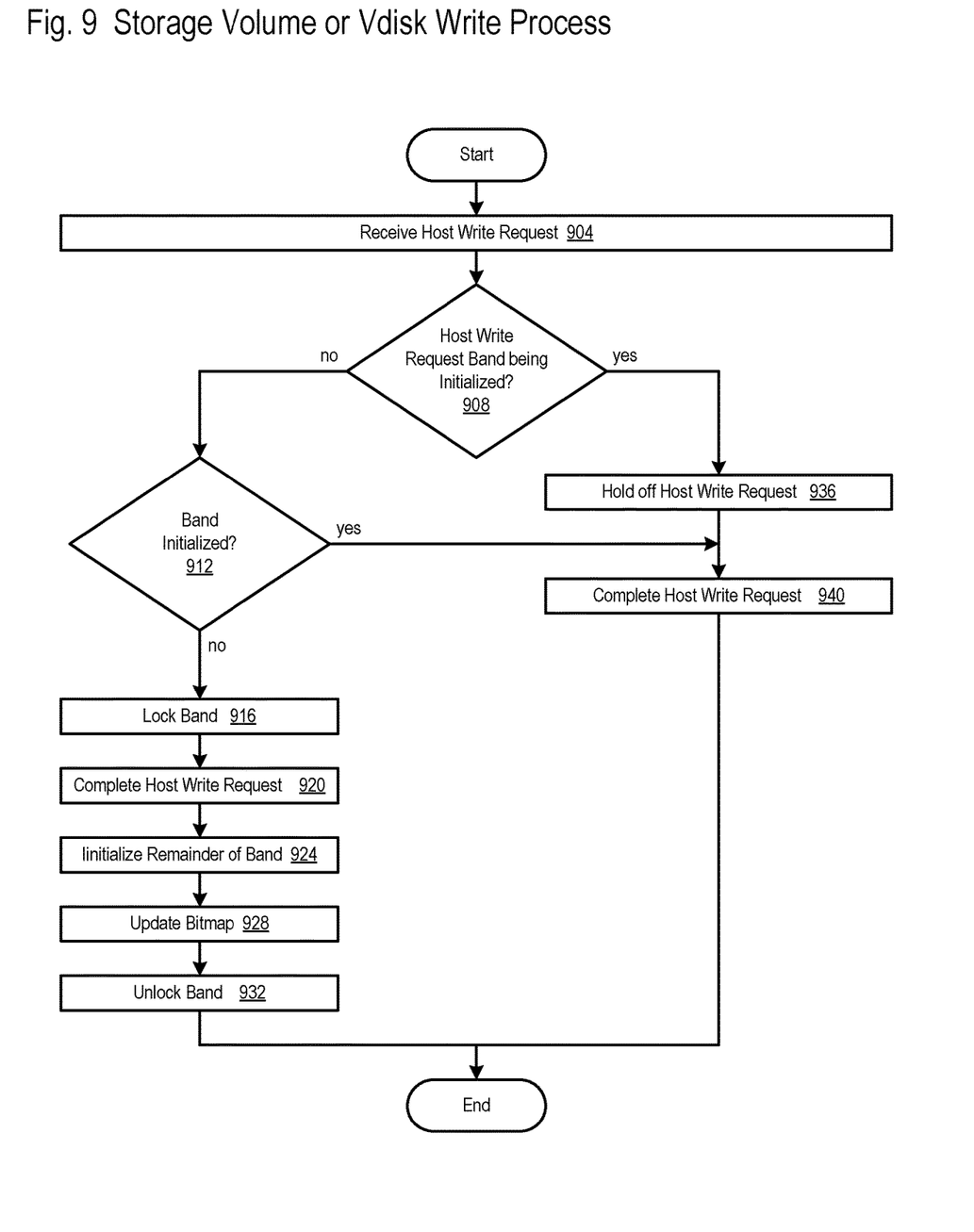
FIG. 9 is a flowchart illustrating a storage volume or Vdisk write process in accordance with embodiments of the present invention.

Referring now to FIG. 9, a flowchart illustrating a storage volume or Vdisk 104 write process in accordance with embodiments of the present invention is shown. Flow begins at block 904.

At block 904, the storage controller 108 receives a host write request 212 from a host computer 104 to a storage volume or Vdisk 104. The host write request 212 is directed to a storage volume 104 that is currently being initialized or formatted to a new format. Flow proceeds to decision block 908.

At block 908, the storage controller 108 determines if the host write request 212 is directed to a band that is currently being initialized 412. If the host write request 212 is directed to a band that is currently being initialized 412, then flow proceeds to block 936. If the host write request 212 is directed to a band 136 that is not currently being initialized, then flow proceeds to decision block 912.

At decision block 912, the storage controller 108 determines if the band corresponding to the host write request 212 is already initialized 408. If the band corresponding to the host write request 212 is already initialized 408, then flow proceeds to block 940. If the band corresponding to the host write request 212 is not already initialized 408, then flow proceeds to block 916.

At block 916, the storage controller 108 locks the band 404 corresponding to the host write request 212. The band is an uninitialized band 404 since it does not correspond to a band currently being initialized 412 or already initialized 408. Flow proceeds to block 920.

At block 920, the storage controller 108 completes the host write request 212 to the uninitialized band 404. Flow proceeds to block 924.

At block 924, the storage controller 108 initializes the remainder of the band 404 corresponding to the host write request 212. Following initialization, the band will be a previously initialized band 420 from a host write request 212. Flow proceeds to block 928.

At block 928, the storage controller 108 updates the initialization bitmap 504 to reflect the band 420 is in the new format. Flow proceeds to block 932.

At block 932, the storage controller 108 unlocks the band 420 corresponding to the host write request 212. This allows further read and write access from host read and write requests 212. Since the band 420 is now initialized, there is no need to track or control further accesses to the band 420. Flow ends at block 932.

At block 936, the storage controller 108 holds off the host write request 212 until the band 412 corresponding to the host write request 212 has been initialized. Since there is an initialization in progress, the host write request 212 is delayed to eliminate the possibility of overwriting the host write request data with initialization data. Flow proceeds to block 940.

At block 940, the storage controller 108 completes the host write request 212. It is permissible to simply complete the host write request 212 since the band 408 is already initialized. Also, further host write requests 212 are allowed to the band 408. Flow ends at block 940.

In some cases, a host write request 212 may span multiple bands 136, so that at least a portion of multiple bands 136 will have new write data. In such a case, block 936 only needs to hold off the host write request 212 to the band 136 being currently initialized. Once the initialization is completed to the current band 136, the host write request 212 will be completed. Other bands corresponding to the host write request 212 (which are not currently being initialized) are handled differently. For bands 136 that are already initialized, the host write request 212 to those bands 136 is allowed to complete (block 940). For bands 136 that are not already initialized, the process of blocks 916-932 is used (lock, write, initialize, update, and unlock).

Figure 10A:
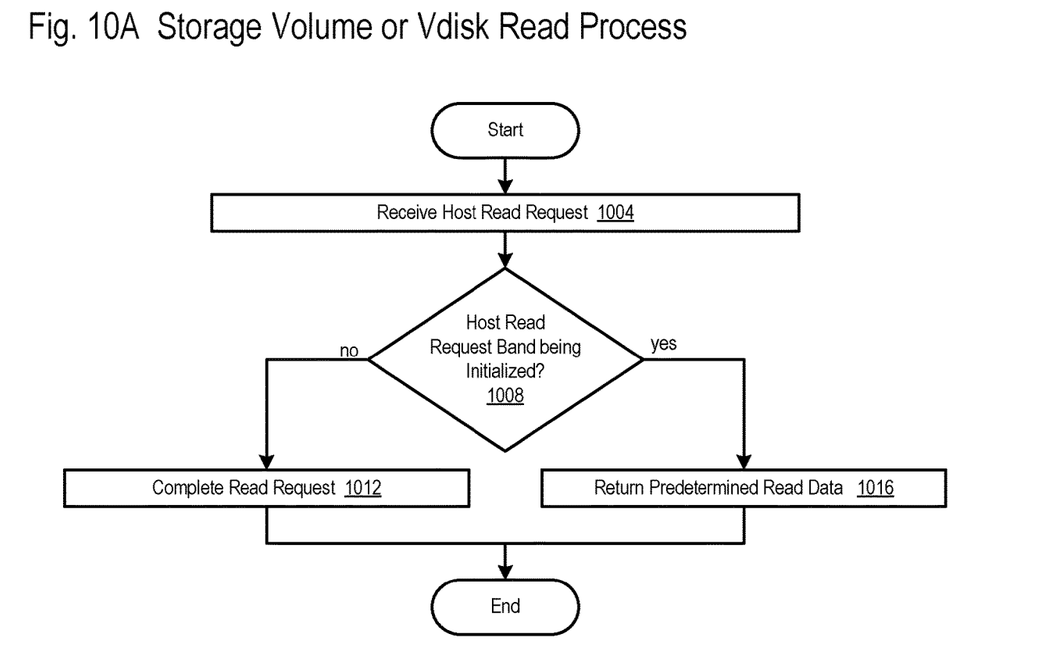
FIG. 10A is a flowchart illustrating a storage volume or Vdisk read process in accordance with a first embodiment of the present invention.

Referring now to FIG. 10A, a flowchart illustrating a storage volume or Vdisk 104 read process in accordance with a first embodiment of the present invention is shown. Flow begins at block 1004.

At block 1004, the storage controller 108 receives a host read request 212 from a host computer 104 to a storage volume or Vdisk 104. The storage volume or Vdisk 104 is currently being initialized to a new format. Flow proceeds to decision block 1008.

At decision block 1008, the storage controller 108 determines if the band corresponding to the host read request 212 is currently being initialized 412. If the band corresponding to the host read request 212 is currently being initialized 412, then flow proceeds to block 1016. If the band corresponding to the host read request 212 is not currently being initialized, then flow proceeds to block 1012.

At block 1012, the storage controller 108 completes the host read request 212 from the storage volume or Vdisk 104 being initialized. Flow ends at block 1012.

At block 1016, the storage controller 108 returns predetermined read data to the requesting host computer 104 that issued the host read request 212. In one embodiment, the predetermined read data is all zeroes. In a second embodiment, the predetermined read data is all ones. In yet another embodiment, the predetermined read data is different than all zeroes or all ones. This is acceptable since it is known that the band 412 is currently being initialized and no previous read data would be valid, as it is being overwritten with a known data pattern (such as all zeroes) during the initialization process. Flow ends at block 1016.

For host read requests 212 that span multiple bands 136, the process of blocks 1008-1016 is still followed, but the host read request is completed 1012 for any bands 136 that are not currently being initialized.

Figure 10B:
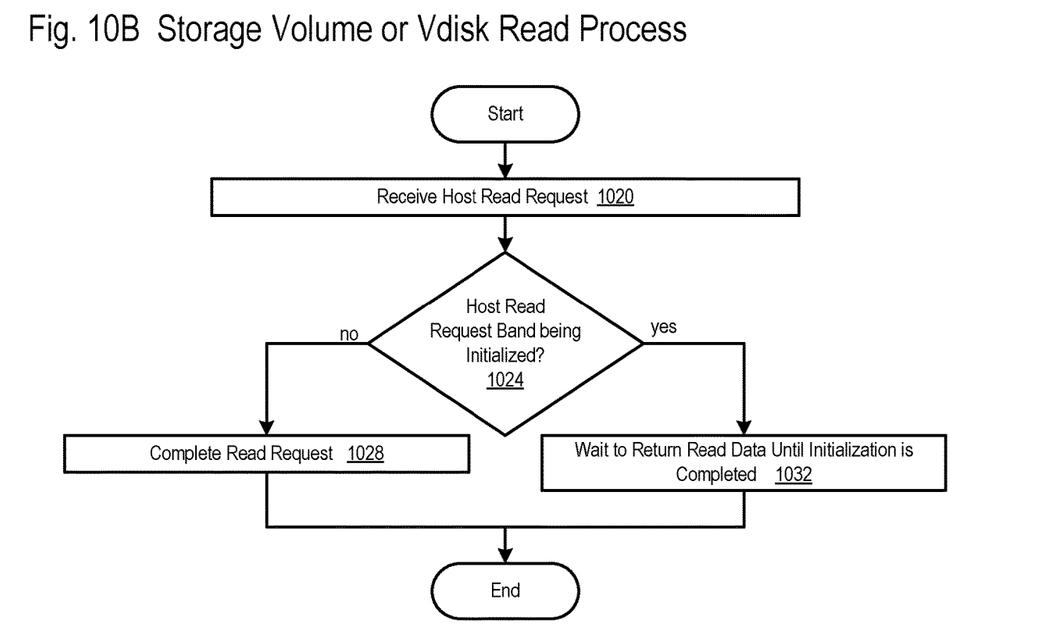
FIG. 10B is a flowchart illustrating a storage volume or Vdisk read process in accordance with a second embodiment of the present invention.

Referring now to FIG. 10B, a flowchart illustrating a storage volume or Vdisk 104 read process in accordance with a second embodiment of the present invention is shown. Flow begins at block 1020.

At block 1020, the storage controller 108 receives a host read request 212 from a host computer 104 to a storage volume or Vdisk 104. The storage volume or Vdisk 104 is currently being initialized to a new format. Flow proceeds to decision block 1024.

At block 1024, the storage controller 108 determines if the band corresponding to the host read request 212 is currently being initialized 412. If the band corresponding to the host read request 212 is currently being initialized 412, then flow proceeds to block 1016. If the band corresponding to the host read request 212 is not currently being initialized, then flow proceeds to block 1012.

At block 1028, the storage controller 108 completes the host read request 212 from the storage volume or Vdisk 104 being initialized. Flow ends at block 1012.

At block 1032, the storage controller 108 waits to return read data corresponding to the host read request 212 until the initialization of the band 412 is completed. Flow ends at block 1032.

For host read requests 212 that span multiple bands 136, the process of blocks 1024-1032 is still followed, but the host read request is completed 1028 for any bands 136 that are not currently being initialized.

Although the process steps of the present invention describe the storage controller 108 performing the actions, it is understood by one of ordinary skill in the art that a CPU or processor 112 generally performs these steps. However, in other embodiments, one or more processors, state machines, programmable logic devices, or other devices may perform these steps.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A storage controller, comprising:
   circuitry configured to utilize a format command to change a storage volume coupled to the storage controller from a first format to a second format, the storage volume comprising a first plurality of bands each comprising a first band size different from a second band size, the second band size corresponding to a second storage volume comprising a second plurality of bands and each band of the first and second plurality of bands comprising an integer number of sectors; and
   memory configured to store the format command and a data structure comprising a single high water mark address variable that tracks a demarcation between bands in the first format and bands in the second format, the format command resident in the memory and configured to be invoked by a user or application program configured to control the storage controller by:
      determining when a selected band is initialized to the second format, the selected band having a lowest starting Logical Block Address within the storage volume selected in response to an initialization direction variable in a first state and the selected band having a highest starting Logical Block Address within the storage volume selected in response to the initialization direction variable in a second state opposite to the first state, and
      in response to the storage controller determining the selected band is not initialized to the second format, the storage controller initializing the selected band to the second format; and
         updating the data structure to indicate the selected band is initialized to the second format.

2. The storage controller of claim 1, wherein after determining that the selected band is initialized to the second format, the storage controller:
   determines there are one or more additional bands of the plurality of bands to initialize to the second format, and in response:
      chooses a next band of the plurality of bands to initialize,
   wherein the next band was not previously initialized to the second format, wherein the storage controller repeats determines, initializes, updates, calculates, and chooses until all bands of the plurality of bands have been initialized to the second format, wherein in response to determining there are not one or more additional bands of the plurality of bands to initialize to the second format, the storage controller creates a notification that the storage volume is in the second format.

3. The storage controller of claim 1, wherein prior to issuing the format command to the storage volume, the storage controller:
   initializes the data structure to a state identifying all bands of the plurality of bands as one of uninitialized and initialized to the first format.

4. The storage controller of claim 1, wherein the notification that the storage volume is in the second format comprises at least one of the storage controller:
   creates an event in a management log; and
   notifies a user that initialization of the storage volume to the second format is complete.

5. The storage controller of claim 1, wherein the storage controller allows read and write access to the storage volume while the storage volume is being initialized to the second format.

6. The storage controller of claim 5, wherein in response to the storage controller receiving a first write request to the selected band, the storage controller:
   determines whether the selected band is either in the first format and initialization to the second format has not been started, currently being initialized to the second format, or previously initialized to the second format,
   wherein in response to the storage controller determining that the selected band is in the first format and initialization to the second format has not been started, the storage controller:
   locks the selected band;
   writes data corresponding to the first write request to logical block addresses of the selected band corresponding to the first write request; and
   initializes data of the selected band having logical block addresses that do not correspond to the first write request,
   wherein in response to the storage controller determining the selected band is currently being initialized to the second format, the storage controller:
   delays the first write request to the selected band until the initialization of the selected band to the second format is completed,
   wherein in response to the storage controller determining that the selected band was previously initialized to the second format, the storage controller:
   completes the first write request to the selected band.

7. The storage controller of claim 5, wherein if the storage controller receives a read request to the selected band while the selected band is being initialized to the second format, the storage controller either:
   provides predetermined read data in response to the read request; or
   waits to provide read data until initialization of the selected band to the second format is completed.

8. The storage controller of claim 1, wherein one of:
   the first format comprises one of unformatted, no Protection Information (PI), and a different type of Protection Information (PI) from the second format, and the second format comprises Protection Information (PI); and
   the first format comprises Protection Information (PI) and the second format comprises no Protection Information (PI).

9. A method comprising:
   issuing, by a hardware storage controller, a format command changing a storage volume from a first format to a second format, the storage volume comprising a first plurality of bands each comprising a first band size different from a second band size, the second band size corresponding to a second storage volume comprising a second plurality of bands and each band of the first and second plurality of bands comprising an integer number of sectors;

selecting a band of the storage volume to initialize, the selected band having a lowest starting Logical Block Address within the storage volume selected in response to an initialization direction variable in a first state and the selected band having a highest starting Logical Block Address within the storage volume selected in response to the initialization direction variable in a second state opposite to the first state;

determining, by the hardware storage controller, when the selected band is initialized to the second format, and when the selected band is not initialized to the second format, initializing the selected band to the second format; and updating a data structure to indicate the selected band is initialized to the second format.

10. The method of claim 9, wherein the first format comprises one of unformatted, no Protection Information (PI), and a type of Protection Information (PI), and the second format comprises a different format than the first format.

11. The method of claim 9, wherein the data structure comprises a bitmap of the bands in the storage volume, wherein the storage volume comprises a plurality of bands, wherein the data structure indicates that the plurality of bands are formatted to the first format prior to initializing the storage volume.

12. The method of claim 9, further comprising:
selecting a band by choosing a band in the first format having one of a lowest and highest starting Logical Block Address.

13. The method of claim 9, further comprising:
determining when the selected band is initialized to the second format by observing that an identifier in the data structure corresponding to the selected band reflects the second format.

14. The method of claim 9, further comprising:
initializing the selected band by writing all sectors of the selected band with predetermined data reflecting the second format.

15. A system comprising:
a storage volume comprising a plurality of bands; and
a storage controller coupled to the storage volume and operable to:
issue a format command to the storage volume to change the format from a first format to a second format, the storage volume comprising a first plurality of bands each comprising a first band size different from a second band size, the second band size corresponding to a second storage volume comprising a second plurality of bands and each band of the first and second plurality of bands comprising an integer number of sectors, select a band of the plurality of bands to initialize, the selected band having a lowest starting Logical Block Address within the storage volume selected in response to an initialization direction variable in a first state and the selected band having a highest starting Logical Block Address within the storage volume selected in response to the initialization direction variable in a second state opposite to the first state, determine when the selected band is initialized to the second format, and in response to the storage controller determining the selected band is not initialized to the second format, the storage controller initializing the selected band to the second format, and update a data structure to indicate the selected band is initialized to the second format.

16. The system of claim 15, wherein the first format comprises one of unformatted, no Protection Information (PI), and a type of Protection Information (PI), and the second format comprises a different format than the first format.

17. The system of claim 15, wherein when there is a first write request to the selected band, the storage controller:
determines whether the selected band is either currently initialized to the first format and an initialization to the second format has not been started, currently being initialized to the second format, or previously initialized to the second format.

18. The system of claim 17, wherein when the selected band is currently initialized to the first format and an initialization to the second format has not been started, then the storage controller:
locks the selected band;
writes data corresponding to the first write request to logical block addresses of the selected band corresponding to the first write request; and
initializes data of the selected band having logical block addresses that do not correspond to the first write request.

19. The system of claim 18, wherein locking the selected band comprises:
preventing, by the storage controller, write requests other than the first write request from being completed to the selected band.

20. The system of claim 17, wherein when the selected band is currently being initialized to the second format, then the storage controller:
delays the first write request to the selected band until the initialization of the selected band to the second format is completed; and
if the selected band is previously initialized to the second format, then the storage controller:
completes the first write request to the selected band without delay.

* * * * *